(12) United States Patent
Sivaraman et al.

(10) Patent No.: US 12,033,222 B1
(45) Date of Patent: Jul. 9, 2024

(54) DEMAND PREDICTION BASED ON USER INPUT VALUATION

(71) Applicant: Wells Fargo Bank, N.A., San Francisco, CA (US)

(72) Inventors: Chandrasekaran Sivaraman, Bangalore (IN); Priya R. Radia, Bangalore (IN); Ashalatha Seetharam, Bangalore (IN); Susmita Santra, Bangalore (IN); Manas Ranjan Sahu, Bangaluru (IN); Mothi Mai Malli Viswanathan, Bangalore (IN); Rajesh P. Mannachery, Bangaluru (IN); Shanmukeswara Rao Donkada, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 309 days.

(21) Appl. No.: 17/199,102

(22) Filed: Mar. 11, 2021

(51) Int. Cl.
| | |
|---|---|
| *G06Q 40/00* | (2023.01) |
| *G06F 16/28* | (2019.01) |
| *G06N 20/00* | (2019.01) |
| *G06Q 30/0282* | (2023.01) |
| *G06Q 40/02* | (2023.01) |
| *G06Q 50/00* | (2012.01) |

(52) U.S. Cl.
CPC .......... *G06Q 50/01* (2013.01); *G06F 16/285* (2019.01); *G06N 20/00* (2019.01); *G06Q 30/0282* (2013.01); *G06Q 40/02* (2013.01)

(58) Field of Classification Search
CPC .... G06Q 40/00; G06Q 40/02; G06Q 30/0282; G06Q 50/01; G06F 16/285; G06N 20/00
See application file for complete search history.

(56) References Cited

U.S. PATENT DOCUMENTS

| | | | | |
|---|---|---|---|---|
| 2011/0320441 | A1* | 12/2011 | Lee | G06F 16/9535 707/723 |
| 2012/0158720 | A1* | 6/2012 | Luan | G06Q 30/0224 707/E17.108 |
| 2013/0346545 | A1* | 12/2013 | Petersen | G06F 16/24578 709/217 |
| 2014/0365354 | A1* | 12/2014 | Shvarts | G06Q 40/08 705/38 |

(Continued)

FOREIGN PATENT DOCUMENTS

WO WO-2012031239 A2 * 3/2012 ......... G06Q 30/0269

OTHER PUBLICATIONS

The role of social media communication: Empirical study of online purchase intention of financial products B Jha—Global Business Review, 2019—journals.sagepub.com (Year: 2019).*

(Continued)

*Primary Examiner* — Lalita M Hamilton
(74) *Attorney, Agent, or Firm* — K&L Gates LLP

(57) ABSTRACT

An electronic social network can be provided that unifies products and services of one or more entities, such as financial institutions. Users of the social network can provide input regarding one or more products or services. Feedback can be solicited from other users of the social network regarding the input, and a score can be generated for a user that represents a level of agreement of the other users. A recommendation is generated and conveyed to users of the social network based on the score and user profile of the user associated with the score.

20 Claims, 10 Drawing Sheets

(56) References Cited

U.S. PATENT DOCUMENTS

| | | | |
|---|---|---|---|
| 2016/0267545 A1* | 9/2016 | Glass | H04L 67/02 |
| 2021/0200753 A1* | 7/2021 | Perelman | G16H 20/10 |
| 2021/0248656 A1* | 8/2021 | Makowsky | G06N 20/00 |
| 2022/0138866 A1* | 5/2022 | Bouganim | G06Q 10/107 |
| | | | 705/319 |
| 2022/0366494 A1* | 11/2022 | Cella | G06N 3/088 |

OTHER PUBLICATIONS

Predicting purchase behaviors from social media Y Zhang, M Pennacchiotti—. . . of the 22nd international conference on . . . , 2013—dl.acm.org (Year: 2013).*

* cited by examiner

DEMAND PREDICTION BASED ON USER INPUT VALUATION

BACKGROUND

Customer experience is a grand basis of competition in the business world. Many enterprises are rushing to deploy the latest technologies in the hope of delivering the next wave of productivity, cost savings, and improvement in customer experience. Further, businesses often support a variety of means of interaction such as in person or electronic by way of websites and mobile device applications.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to discovery, evaluation, and recommendation of products and services based on a determined valuation of user input. An electronic social network or like system can provide a means for discovery, evaluation, and recommendation of products or services of a single entity or multiple entities. Financial information recorded by a financial institution can be exploited to identify transactions. Users can provide input regarding one or more transactions to express an opinion regarding a product or service associated with the transaction. In one instance, the user input can correspond to a review or rating of a product or service. Such user input can be available to other users to aid in discovery and evaluation of a product or service. Further, a mechanism can be provided to allow other users to provide feedback regarding the user input. More specifically, other users can register an extent of agreement or disagreement with the user input. A score can be computed for a user and user input based on the feedback provided by other users. The score provides a mechanism to discover valuable or quality data from large quantities of data. Use of quality data reduces storage requirements and processing time, while also improving accuracy associated with predictions and recommendations associated with demand for products and services.

According to one aspect, a system is provided comprising a processor coupled to a memory that includes instructions, that when executed by the processor, cause the processor to compute a score associated with a user input posted in an electronic social network by a user that reflects a degree of agreement of other users in the electronic social network based on feedback from the other users, determine a recommendation for the user based on a user profile and the score, and convey, for display on a display device, the recommendation in the electronic social network. In one instance, the electronic social network is a financial social network concerning financial products or services. Further, the financial social network can unify interactions with multiple financial institutions. The user profile can in one scenario comprise information regarding past purchases provided by a financial institution. In one embodiment, the recommendation comprises identification of a product or service and one or more other users that have commented regarding the product or service. The recommendation can be determined by way of machine learning, wherein machine learning is trained with training data based on score.

According to another aspect, a method is provided that, when executed, performs operations. The operations include computing a score associated with a user based on user input posted in an electronic social network and feedback from other users in the electronic social network, identifying one or more users of a group of users in the electronic social network based on comparison of the score with a predetermined threshold, predicting a product or service that is likely of interest based on a user profile of the one or more identified users, and recommending the product or service to the group of users in the electronic social network. The method further comprises computing a score that represents a level of agreement of the other users with the user input. The method can further comprise determining the group of users based on similarity of user profiles. The method further comprises requesting transaction data from a financial institution of the user and populating the user profile with the transaction data received from the financial institution. The method further comprises predicting the product or service from a set of financial products or services and predicting the product or service from the set of financial products from a plurality of financial institutions. Further, the method comprises computing the score based on user input comprising at least one of a review or rating of a product or service and the feedback.

In accordance with another aspect, a method comprises executing, on a processor, instructions that cause the processor to perform operations. The operations include providing an electronic social network associated with financial services offered by a plurality of financial institutions, generating a user profile comprising data received for a customer of at least one of the plurality of financial institutions and a user of the electronic social network including financial transactions, conveying, by way of the social network, user input regarding a financial transaction, computing a score associated with a user based on feedback received regarding the user input reflecting a level of agreement of other users with the user input, and generating a recommendation of a product or service based on the score associated with the user. The operations can further comprise selecting the user from a group of users based on the score and predicting the product or service that is likely of interest based on the user profile of the user. In one instance, machine learning can be employed to predict the product or service that is likely of interest. Further, operations can comprise determining a group of users including the user and presenting the recommendation to members of the group.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Figure 1:
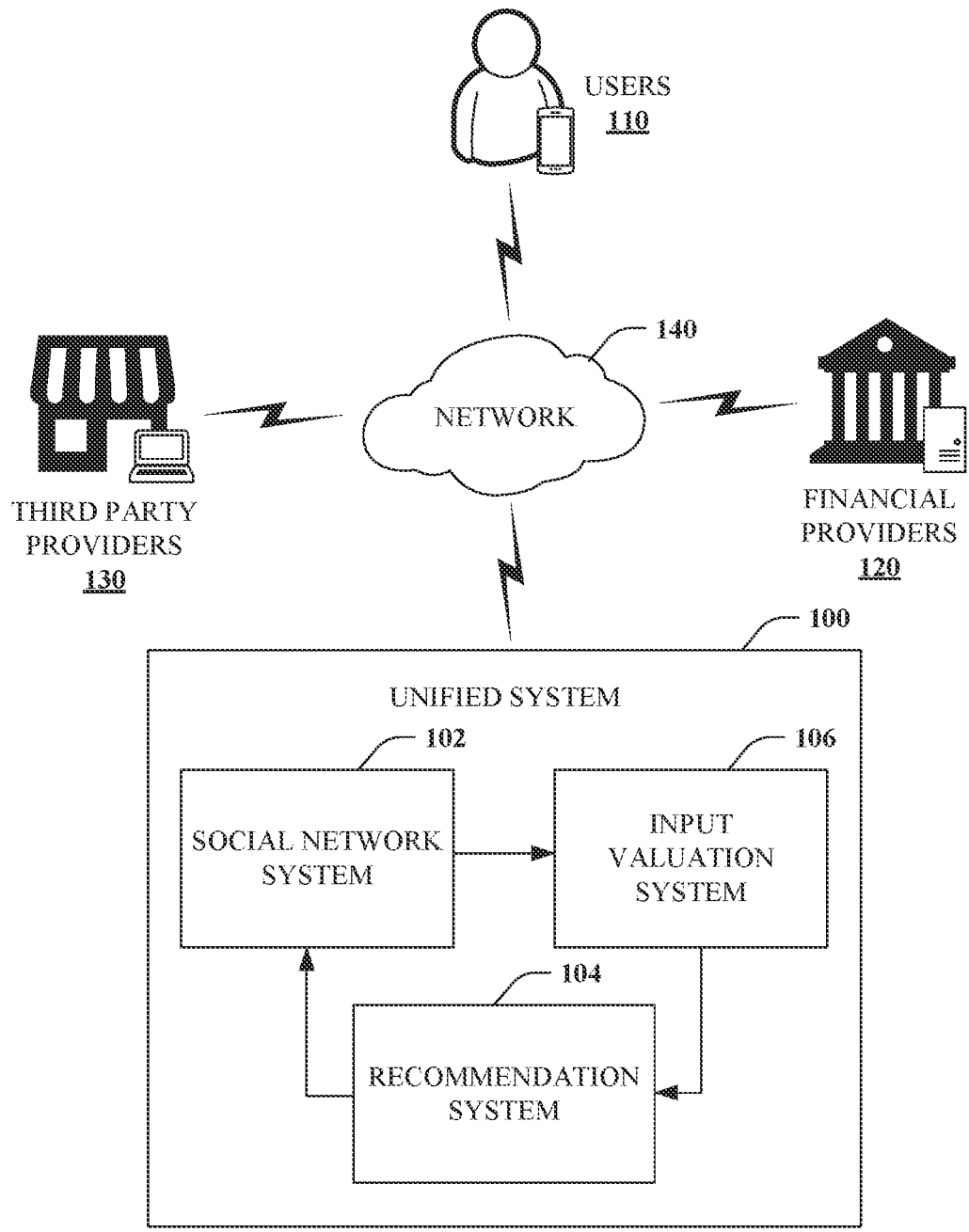
FIG. 1 illustrates an overview of an example implementation.

Individuals tend to purchase products and services from a variety of diverse vendors online or at physical stores. In some instances, general products and services can be offered by a single vendor. However, highly specific services, such as financial services, remain separate. For example, people are motivated or influenced to open bank accounts or seek bank services from different banks. In addition, customers tend to buy different bank products from various banks. As such, customers have to access various banking platforms to learn and evaluate products of distinct banks. A particular bank can seek to employ artificial intelligence to aid customers and potential customers in discovering products of interest by way of recommendation or suggestion.

Artificial intelligence is an overarching category that relates to an ability of a non-naturally occurring entity, such as a computer or machine, to think and make decisions intelligently similar to humans. Machine learning is a subcategory of artificial intelligence that is able to automatically learn from experience. Learning is based on training data. The ability of a system that implements machine learning is based on the quantity and quality of training data.

For enterprises, such as financial institutions, the quantity of training data is inherently large. For example, most people have bank accounts and most of their transactions are handled by the bank. Thus, banks already have access to a plethora of training data regarding financial transactions. Nevertheless, the bank has no way of determining the quality of the training data. As such, machine learning models can be less accurate than otherwise possible if training data were high quality.

Details provided herein generally pertain to a unified platform for discovery, evaluation, and recommendation of products and services. Information associated with specialized products and services, such as those associated with financial institutions, can be unified across multiple financial institutions or other providers. Rather than requiring individuals to connect with multiple banks by way of numerous banking platforms, a unified platform can be provided to allow individuals to access products and services across multiple banks. In one instance, the unified platform can correspond to a social network for financial services. Further, transactional data associated with customers can be utilized in conjunction with machine learning to provide targeted recommendations. Furthermore, a mechanism can be provided to allow customers to provide input regarding purchases, for example in the form of comments, a rating, or both. Still further yet, other customers can provide feedback regarding a particular customer's input expressing a degree of agreeableness or disagreeableness. Such feedback provides an ability to identify quality data amongst a large quantity of data for use in optimizing machine learning. Limiting the amount of data that needs to be processed improves performance and an ability to exclude outliers improves the accuracy of predictions made by way of machine learning. Such predictions or corresponding recommendations can be made for the benefit of users as well as providers of products or services such as a financial institution.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a high-level overview of an example implementation is illustrated and described. As depicted, the implementation includes unified system 100, users 110, financial providers 120, third-party providers 130, and network 140. The unified system 100, users 110, financial providers 120, and third-party providers 130 are communicatively coupled by way of the network 140, which can be a wired or wireless local area network (LAN) or wide area network (WAN) such as the internet, among other things.

The users 110 can represent users of the unified system 100, and customers or potential customers of the financial providers 120 and optionally the third-party providers 130. The users 110 can include personal computers, tablets, smart phones, or other computing devices employed by individuals to enable network communication and interaction with the unified system 100. In one instance, an application can be loaded on to a computing device of a user that accesses and interacts with the unified system 100 or portions thereof. In another instance, the unified system 100 or portions thereof can be embodied as a network accessible service can be accessed by way of a web browser or the like.

The financial providers 120 correspond to a plurality of financial institutions or entities and associated computing devices (e.g., servers, databases . . . ) that provide one or more bank services. For example, bank services can include mobile and online banking, acceptance of deposits, check payment, collection and payment of credit instruments, and remittance of funds, among other things. The financial providers 120 can include at least one bank with which a user of the users 110 has already registered. In such a scenario, the financial providers 120, by way of computing devices and the network 140, can provide customer information to the unified system 100 including name, contact details, address, identity details, bank account number, branch of the bank where the account was opened, as well as transaction details of the user, among other things. In one instance, provisioning of information or portions of information or data to the unified system 100 is subject to user permission. In other words, a user can control data provided to the unified system 100 by the financial providers 120 by granting or denying permission.

The unified system 100 provides a mechanism to enable collection and provisioning of information with respect to one or more financial institutions on a single platform. The unified system 100 can operate on one or more network connected servers or other computing devices and allow registration of one or more users 110 and financial providers 120. In accordance with one embodiment, as shown here, the unified system 100 can comprise three sub-systems, namely social network system 102, recommendation system 104, and input valuation system 106.

The social network system 102 is configured to provide a dedicated website or other application that enables users to communicate with each other electronically by posting information, comments, and messages, among other things. In one instance, the social network can comprise social interactions with respect to products and services, such as banking products and services. The users 110 can access the social network and a profile can be generated for each user. In accordance with one aspect, transaction data associated with a user can be provided by a financial provider 120 at least for use in generation of a profile. For example, the user 110 can access the social network provided by the unified system 100 and login or otherwise provide authorization for the financial provider 120 to share transactional data with the unified system 100.

The recommendation system 104 can utilize the user profile including transactional data to generate predictions, recommendations or suggestions regarding products or services in which a user may have interest. The predictions, recommendations or suggestions can be provided to users 110 by way of at least the social network system 102. For example, a user profile can be accessed and utilized by the recommendation system 104 to predict user demand and provide a list of products or services a user may desire to purchase. In one instance, the recommendation system 104 can analyze purchase history of a user, determine information regarding the amount of money a customer spends on various products and frequent purchases, and predict and recommend bank products to the user based on the analysis. In other words, a product or service wish list can be predicted or inferred based on past purchase history and other information from a user profile pertaining to user characteristics or behavior. After a product or service is predicted to be desirable for a user 110, the recommendation system 104 can identify other users 110 that have purchased the product or service based on transaction history. Further, the recommendation system 104 can connect the user to the other users 110 and user input provided by the other users 110, such as a product review or rating to aid discovery and evaluation of a product or service.

The input valuation system 106 is configured to at least aid generation or refinement of the recommendation system 104. Input can be provided from customers in the form of comments or a rating with respect to a purchased product. The value of the user input can be assessed with respect to feedback from other users including whether or not, or to what degree, they agree with the user input. The value can be captured as a numerical score, or crowd guarantee score, or any other means of scoring or rating (e.g., stars, scale . . . ). In this manner, determination of reliability of a user, or user input, can be enabled based on feedback provided by other users. In other words, the score represents a probability that a user is similar to other users, for example with respect to an opinion regarding a product or service.

In accordance with a particular aspect, the score can be utilized in conjunction with machine learning. For example, clustering can utilize the score to aid in identifying like or similar users based on agreement or disagreement with respect to user input. Moreover, the score can be employed to enable identification of quality data from amongst a large quantity of data. In this manner, predictions, including suggested products of interest, can be improved by including high quality data and excluding low quality data, for instance by weighting data based on score. The input valuation system 106 can determine the score computed based on feedback by other users on user input of another and provide at least the score to the recommendation system 104 for further use and processing. In accordance with one aspect a discount can be offered to a user on a product or service based on a score of a user. In this manner, users can be motivated to contribute to provisioning of high-quality data by providing valuable feedback.

A user 110 can access a financial social network provided by the unified system 100 by way of a computing device. Upon initial access, the user 110 can create an account including supplying information about himself or herself. Further, the user 110 can provide information regarding a bank account of the user and authorize use of financial data associated with the bank account. The financial data can include bank account number, branch of the bank where the user opened the account, transaction details of the user, and purchase history, among other things. The financial data together with user information, such as name, address, ethnicity, religion, occupation, and age, can be stored within and form part of a user profile. The recommendation system 104 can utilize the user profile to present opportunities likely to be of interest to the user 110 by way of the social network, such as a product or service of a financial provider 120.

A user 110 can be afforded a means for providing input regarding a purchased product or service, for instance, as determined from financial transactions of the user or other information, by way of the social network. The input can be in the form of a written comment describing a product or service and the user's experience or opinion of the product or service. Further, the input can be a rating in terms of a numerical value or a number of stars, among other things, reflecting an opinion regarding the product or service. The user input can educate others of benefits or disadvantages of a product, or, in other words, a product review, which can be valuable to others in the social network looking into a similar purchase. Furthermore, the comments, rating, or the like can be utilized as part of training data associated with machine learning based systems and methods such as the recommendation system 104.

In addition to making use of user input for purchasing decisions, feedback can be provided with respect to the user input. For example, a first user can express whether or not the first user agrees with user input of a second user. In one instance, an incentive can be utilized to motivate provisioning of feedback, such as a product discount. A score can be computed and associated with a particular user based on feedback of other users. Subsequently, the score can be utilized to facilitate identification of quality data amongst large quantities of data to improve machine learning and probabilistic analysis associated with providing predictions and recommendations, among other things.

The financial social network can provide recommendations to user 110 regarding potential products or services of interest. Additionally, the financial social network can identify other users that purchase the product or service and user input comprising a review of the product or service. In accordance with one aspect, identification of other users 110 that purchased the product or service can be filtered based on a score representing agreement with the input provided by a number of other users of the social network. For example, the score can be compared to a predetermined threshold capturing a baseline for trustworthiness or agreement associated with validating the user input or user.

Prediction and recommendations are not limited to benefiting users 110. Rather, predictions and recommendations can also be provided for the benefit of the financial providers 120. For example, popularity and demand for products and services can be determined based on the predictability of various customers. Furthermore, demand for future products or services can also be determined or inferred based on learned customer behavior.

Third-party providers 130 can be involved in the subject implementation. Third-party providers are distinct from users 110 and financial providers 120. In one instance, the third-party providers 130 are commercial service providers registered with a financial provider 120, such as a bank, and coupled to the financial providers 120 and unified system 100 by way of a computing device and the network 140. The third-party providers 130 can provide information regarding various products offered by way of a financial provider 120. In one example, the third-party providers 130 can be companies manufacturing or selling products. Further, the third-party providers 130 can be utilized by the recommendation system 104 to determine current market value of a product to consider or provide with respect to recommendations. Additionally, or alternatively, the third-party providers 130 can be additional suppliers of goods and services. In this way, the unified system 100, can be optionally extended to provide more than financial products or services of the financial providers 120. Rather, the unified system 100 can support other suppliers of highly specific products or services or substantially any other supplier.

Figure 2:
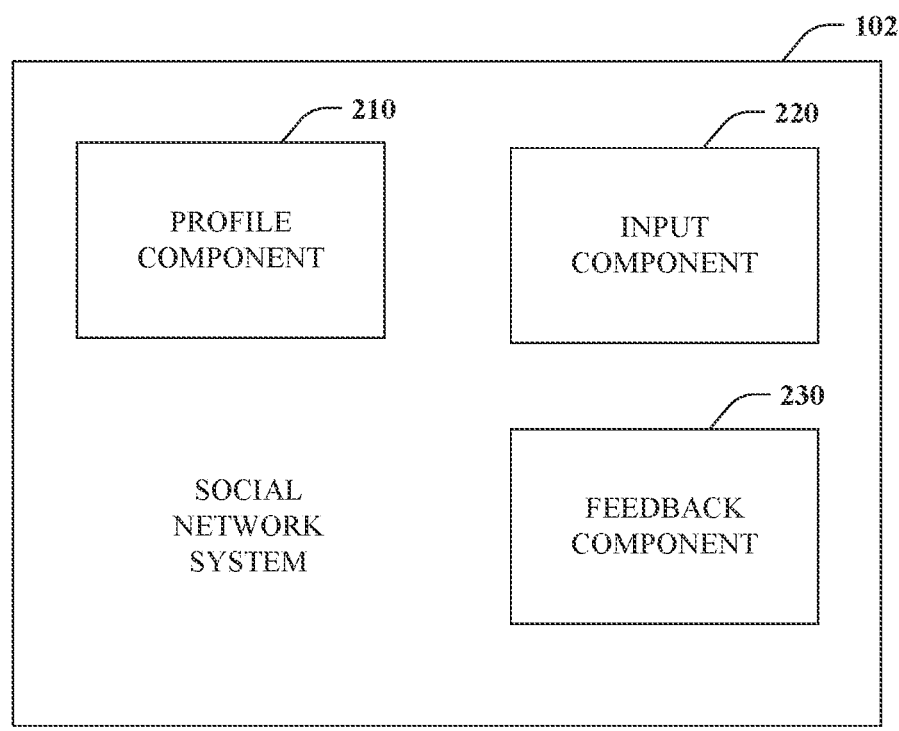
FIG. 2 is a block diagram of a sample social network system.

FIG. 2 depicts the social network system 102 in further sample detail. The social network system 120, sometimes referred to a social network service or platform, facilitates development and maintenance of a social network online by connecting users and user created content to other users. As shown, the social network system 102 can include profile component 210, input component 220, and feedback component 230. In accordance with one embodiment, these are computer executable components that, when executed by a processor, cause the processor to implement the functionality of the social network system 102 in conjunction with other computing hardware. In one instance, the profile component 210, input component 220 and feedback component 230 can execute on one or more servers to provide an electronic social network system as a service to network connected computing devices.

The profile component 210 is configured to generate and maintain profiles of users of the social network system 102. Upon initial registration or signup with the social network system 102, a user can be prompted to provide certain information. For example, the information can include name, address, gender, marital status, occupation, ethnicity, religion, education, income, interests, and hobbies, among other demographic information. This information can be stored as a profile associated with the user. Moreover, in accordance with one aspect of this disclosure, information can be acquired from a financial institution and utilized to populate a user profile. For example, a user can permit and facilitate transmission of information from a user's bank to the social network system 102. Financial information or data can include bank account number, branch of the bank where the account was opened, transaction details of the user, and purchase history, among other things. In one instance, the social network system 102 can provide a mechanism that allows a user to log into a bank account and initiate transfer of data or information that can form part of a user profile. Further, the transfer mechanism can provide control over what data is transferred to address user privacy concerns. In other words, a user can dictate what data or information is utilized in conjunction with the social network system 102 or parts thereof.

The input component 220 is configured to receive input from users within the social network system 102. The input can be of a variety of types and forms. For example, the input can be a comment, post, or rating. In one particular instance, the input can correspond to a product or service review. For example, a user can write a review or specify a ranking of a product or service purchased by the user and captured by a financial transaction from the bank of the user. In other words, a user can review or rate past transactions. The input component 220 can expose user input, in the form of a comment or rating, for example, to other users of the social network system 102. The input can be public to all users or provided solely to a subset of users, such as friends or followers. Other users can exploit user input for educational purposes such as clarification as well as understanding of benefits or disadvantages of the product or service.

The feedback component 230 of the social network system 102 is a mechanism configured to enable receipt of feedback regarding user input provided by way of the input component 220. The feedback can indicate the extent to which others agree or disagree with user input. For example, the feedback can simply indicate that another user of the social network agrees or disagrees with a comment or rating of a user regarding a product or service. Alternatively, the feedback can indicate a level for which another user agrees or disagrees with the input provided. For example, the feedback can be a numeric value from one to ten in which ten indicates strong agreement and one denotes strong disagreement. Users can be attracted to input of another user with respect to a product or service of interest. Before, during or after viewing of the input, feedback can be solicited. In accordance with one aspect, further motivation can be provided to encourage provisioning of feedback. For example, discounts on a good or service can be provided. Additionally, a reward system can be set up to monitor feedback and provide reward points that can be utilized to purchase or discount purchase of a product or service. Received feedback can be documented and made available to the input valuation system 106.

Figure 3:
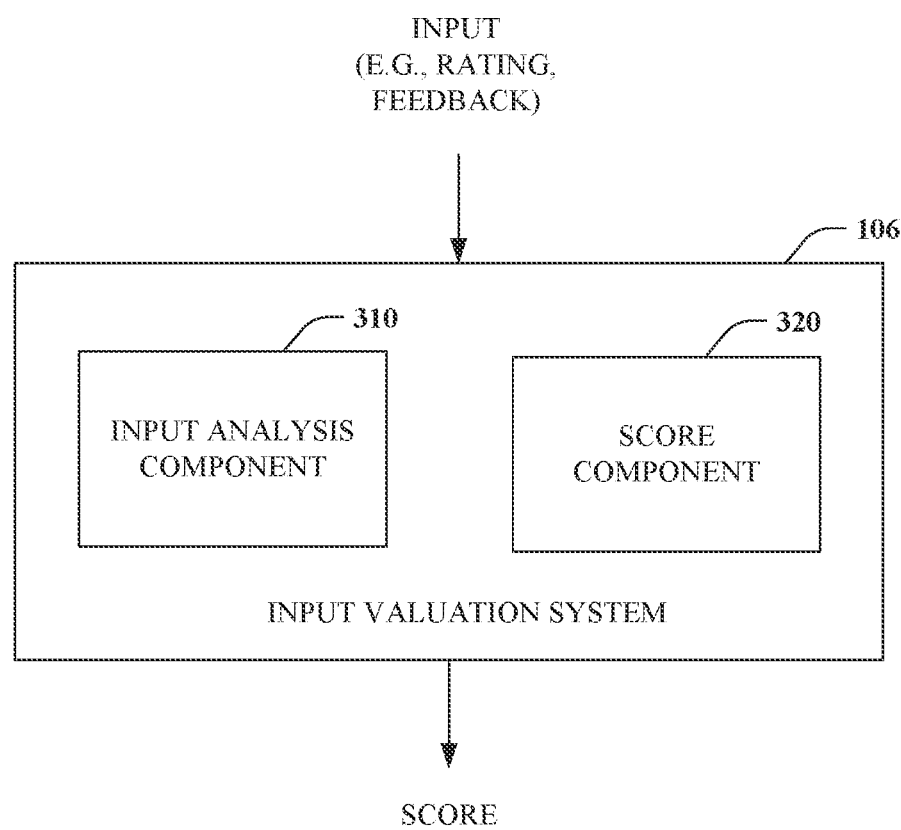
FIG. 3 is a block diagram of an example input valuation system.

Turning attention to FIG. 3, the input valuation system 106 is illustrated in further example detail. The input valuation system 106 is configured to assign a value to a user, or user input, that represents agreeability as determined by feedback from other users. The input valuation system 106 comprises input analysis component 310 and score component 320, which can be computer executable components comprising instructions that, when executed by a processor, cause the processor to implement functionality of the input valuation system 106.

The input analysis component 310 is configured to analyze user input and feedback regarding the input. The input analysis component 310 can receive, retrieve, or otherwise obtain or acquire input from a social network, for example. The input analysis component 310 is constructed to identify input from a user such as a comment or rating regarding a product or service. For instance, input can be parsed and semantically analyzed to recognize social network posts that pertain to product or service reviews. Further, the input analysis component 310 can be configured to identify feedback associated with input. For example, the feedback can be a rating of either agree or disagree or a spectrum between agree and disagree (e.g., strongly agree, agree, neutral, disagree, strongly disagree). Additionally, or alternatively, text analysis can be employed to extract feedback with respect to whether or not other users agree or disagree with input from follow up comments or posts.

The score component 320 is configured to generate a score associated with a user or user input from user feedback. The score component 320 can receive, retrieve, or otherwise obtain or acquire user input and feedback of other users to the input from the input analysis component 310. A score can be computed that represents the feedback of other users. More specifically, the score can indicate whether other users agree or disagree with user input. In one instance, the score can be a number representing a percentage of other users who agree with the input and/or disagree with the input. For example, if eight other users agree with the input and two people disagree, the score can be eighty for eighty percent or eighty out of one hundred. The score can thus be termed a validation score associated with determining whether or not user input is valid in the view of other users. Alternatively, other users can be deemed a crowd that supplies feedback regarding the validity of input. Thus, the score can also be considered as a crowd guarantee score that represents the opinion of a group of users regarding input validity or accuracy.

In one instance, the score can be associated with the user as opposed to solely the user input. If input is provided regarding a single product or service, the score associated with the input and user can be substantially the same. However, the scores can differ when input is provided with respect to several products or services. For instance, an aggregate score can be computed based on scores associated with multiple instances of user input. By way of example, user input scores of eighty and twenty can be averaged to produce an aggregate score for a user of fifty. Of course, more complex aggregate scores can be produced, for example, based on weighting one score higher than another score based on the number of other users that provided feedback or scores associate with those providing feedback. Overall, an aggregate score, or user score, can capture the reputation of a user in terms of providing valid and accurate reviews regarding products and services. In other words, the user score can capture a probability that opinions and decisions of a customer are similar to, as opposed to divergent from, other customers. The user score can subsequently be employed to aid generation of recommendations for the benefit of users as well as financial providers, among others, as will be discussed below.

Figure 4:
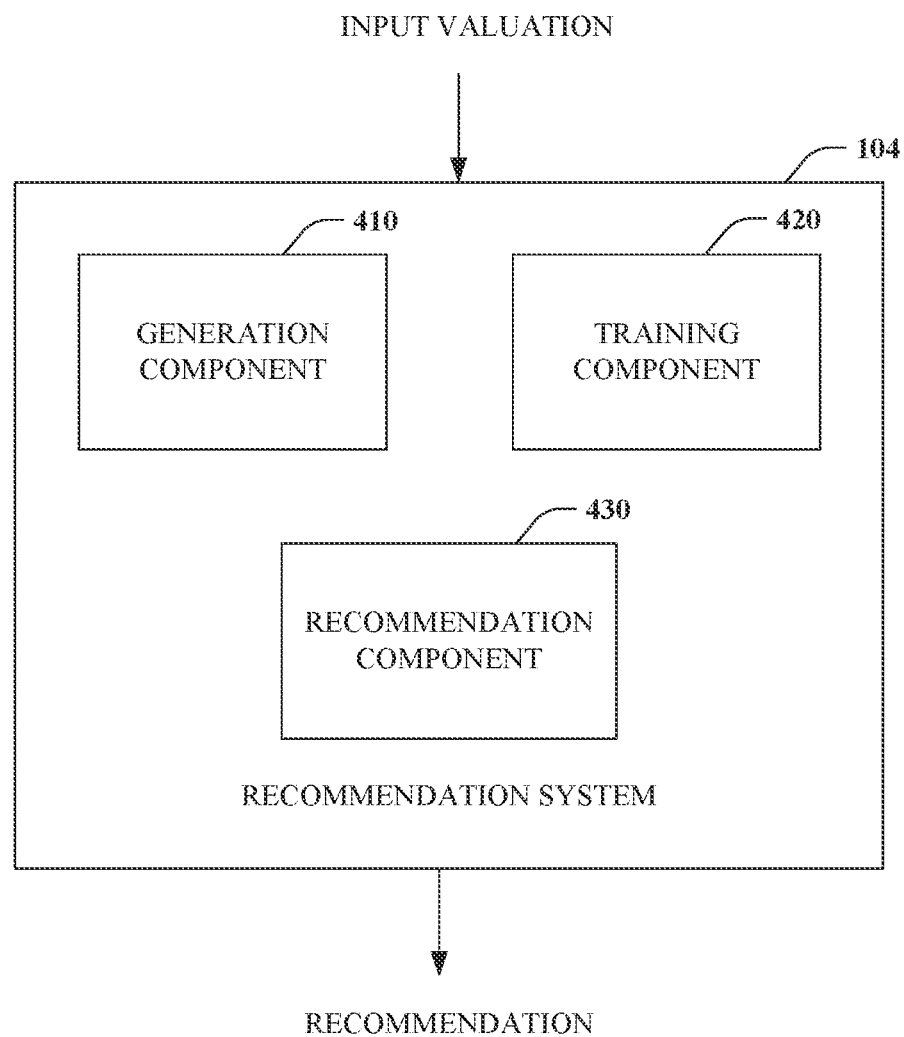
FIG. 4 is a block diagram of an example recommendation system.

Turning attention to FIG. 4, the recommendation system 104 is illustrated in further example detail. The recommendation system 104 is configured to generate a recommendation based at least in part on the input valuation. In accordance with one embodiment, the recommendation system 104 can implement a machine learning process that outputs a prediction regarding products or services likely to be of interest to a particular user. The recommendation system 104 includes generation component 410, training component 420, and recommendation component 430, which can be computer executable components comprising instructions that, when executed by a processor, cause the processor to implement functionality of the recommendation system 104.

The generation component 410 is configured to generate a machine learning model that can be utilized to make predictions regarding products or services of interest. The machine learning model can be capable of self-learning without being explicitly programmed. Stated differently, the machine learning model learns on its own from experience. Any number of types of models can be generated including supervised learning, unsupervised learning, and reinforcement learning types. Particular techniques can include, but are not limited to, regression, decision trees, random forest, and classification including naive Bayes, and support vector machines. Further, the generation component 410 can instantiate deep learning models such as artificial neural networks. Still further yet, the generation component 410 can utilize a combination of two or more model types or techniques.

The training component 420 is configured to train a model produced by the generation component 410. In a supervised learning context, the training component 420 provides training data to a machine learning model comprising data and a label describing the data. The training data can be utilized by the model to automatically learn from the training data. In other words, learning is guided by training data examples. In one instance, a portion of training data can be withheld with respect to training and instead utilized to evaluate performance and fine tune machine learning parameters.

The recommendation component 430 provides a mechanism to invoke a model generated by the generation component 410 and trained by the training component 420. Alternatively, the recommendation component 430 can correspond to the trained model itself, which can be invoked to make a prediction regarding a product or service of interest.

In accordance with one aspect, input valuation can be utilized to render a machine learning process performed by the recommendation system more efficient as well as accurate. For example, a score representing a level of agreement of other users can be linked to a user profile. Rather than employing all data regarding a product or service, data can be restricted to users with scores above a predetermined threshold. In this manner, the data of a subset of users can be employed as representative of other users. Consequently, the amount of data that is utilized to generate and train a model is reduced and outliers are eliminated causing the predictions to be more accurate. Further, provisioning of scores by users can be utilized as a basis for clustering users, for example utilizing unsupervised learning. For instance, users that agree with input provided by a user can be clustered together and users that disagree can be clustered together for purposes of product or service recommendation.

The recommendation system 104 can essentially employ machine learning to learn behavior of users with respect to products or services based on a user profile including information regarding financial transactions, ratings, and score. Similarity of users can also be determined. The learned behavior can then be utilized to predict a likely reaction to products or services of similar users. For example, similar users may be interested in the same products or services. Further, a reaction from a user to a product or service, which the user has not tried or a potential future product or service, can be determined based on a description of the product or service, and learned behavior of the user. For example, a prediction can be made that a user would likely give a product or service a high rating. Predictions that can be made based on the learned behavior can form a basis for one or more recommendations or suggestions. For example, a prediction that indicates a user will respond positively to a product or service can be utilized as a basis to recommend the product or service to the user. Additionally, or alternatively, a prediction can identify popularity or demand for a current or future product or service, which can be provided to a supplier, to aid decision making.

What follows are two diagrams and description regarding a particular embodiment. The diagrams and corresponding description are not meant to be limiting but rather to highlight aspects of the subject disclosure as it pertains to a specific embodiment or implementation to aid clarity and understanding. Other embodiments are possible and contemplated.

Figure 5:
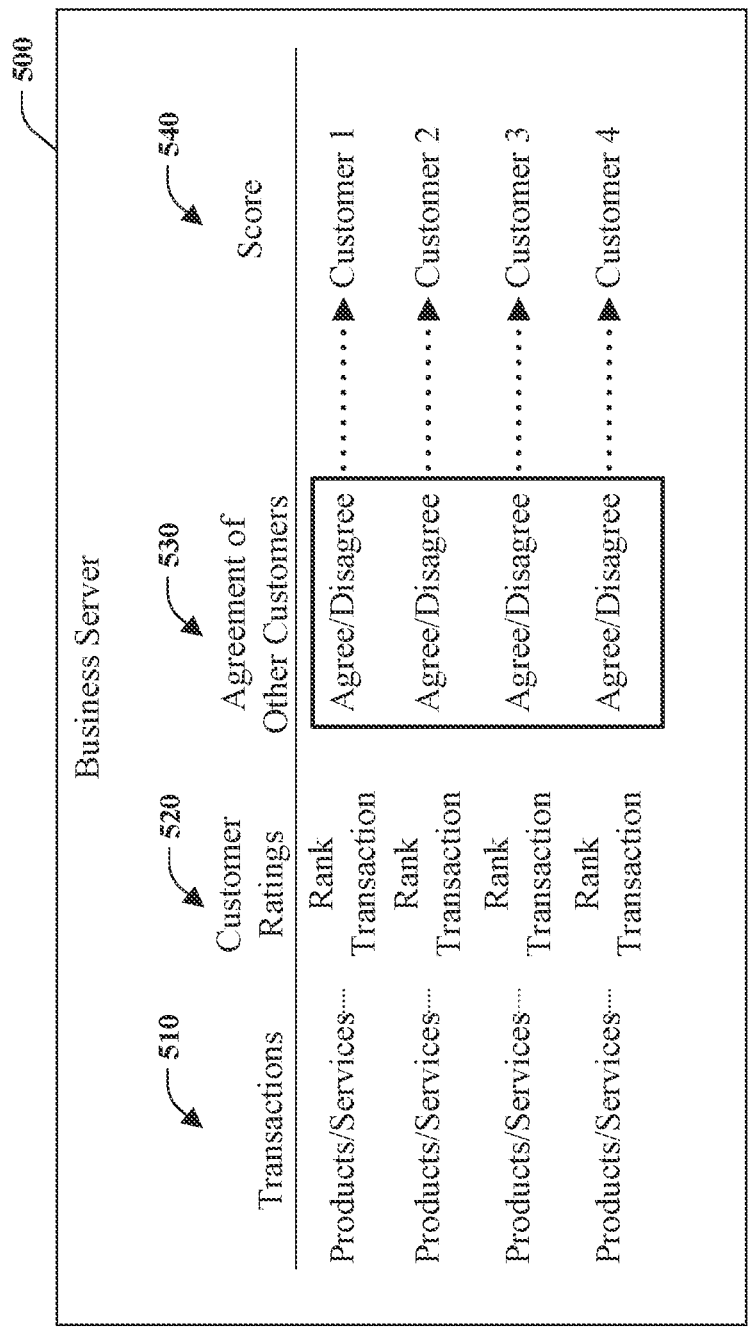
FIG. 5 is a block diagram illustrating generation of a score by a business server.

Referring to FIG. 5, a business server 500 is shown depicting score generation by a business server. In one instance, the business server 500 corresponds to one or more bank servers. The business server 500 can receive, retrieve, or otherwise obtain or acquire information regarding transactions 510, customer ratings 520, and agreement of other customers 530. The transactions 510 can identify products or services purchased by a customer. The customer can provide input such as a customer rating 520 of a transaction. For example, a customer of a bank can access his/her bank profile and attach a rating to a transaction. The rating can be of a value or form indicating a degree of satisfaction or dissatisfaction regarding the transaction (e.g., 1-10, A-F . . . ). Alternatively, the rating can be a binary rating indicating whether or not the customer was satisfied with the transaction (e.g., yes/no, thumbs up/thumbs down, smile face/frown face . . . ). Other customers may view the customer rating 520 and indicate agreement or disagreement with the rating, captured as agreement of other customers 530. Similar to the customer rating 520, the agreement of other customers 530 can be a simple binary choice such as agree or disagree, as shown, or a degree or level such as from a number one to five. The business server 500 can utilize at least the agreement of others 530 value to compute a score 540 associated with the customer. In one instance, the score 540 can be termed a crowd guarantee score, as it represents the opinion of a group of customers, the crowd, regarding the validity or accuracy of a customer rating. In one example embodiment, a customer that is awarded a high level of agreement by other customers can have a correspondingly high crowd guarantee score. Further, the score 540 can be an aggregate score over a plurality of products/services, customer ratings, and agreement of other customers.

Figure 6:
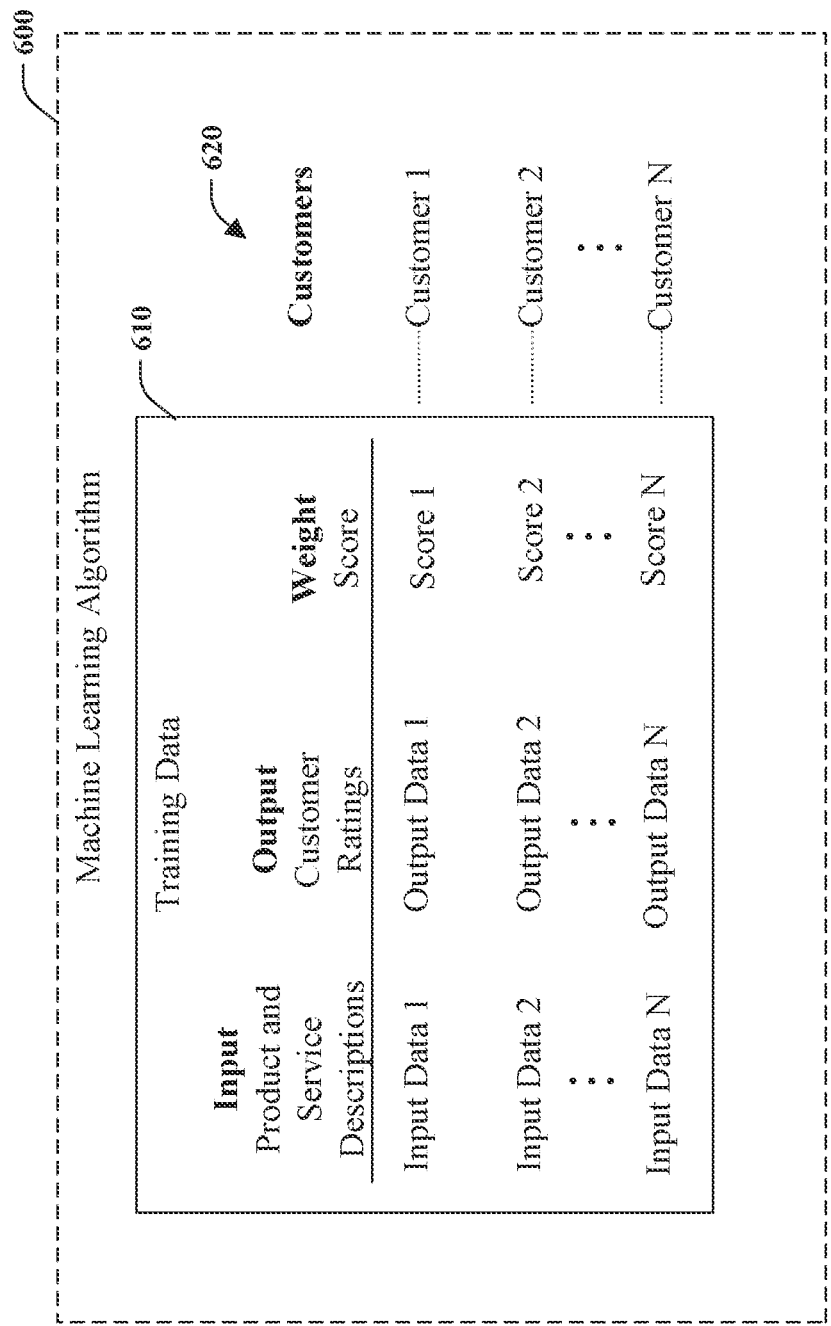
FIG. 6 is block diagram depicting training data employed with machine learning to determine customer behavior.

Turning attention to FIG. 6, a machine learning algorithm 600 is depicted. The machine learning algorithm 600 can be implemented on a computing device and utilized to predict a likely rating of a product or service given ratings of other products or services. As shown, the machine learning algorithm can learn, or be trained, by way of training data 610. Here, the training data 610 can include input such as product or service description and output such as customer ratings. Moreover, a score associated with a level of agreeableness is employed as a weight applied to other data of a customer. The score can thus appropriately weight customer data such that if the score is high, representing a high level of agreement with other customers, the data is of higher value than others with respect to predicting future behavior of customers. By contrast, a lower score, representing a low level of agreement with other customers, can be used to reduce the value with respect to prediction. The output of the machine learning algorithm 600, in one instance, can be customer ratings of products or services 620.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, among others, can automate certain mechanisms or processes performed thereby to make portions of the systems and methods more adaptive as well as efficient and intelligent. By way of example, and not limitation, the recommendation system 104 can employ such mechanisms to automatically learn and make predictions regarding products or services including, but not limited to, predictions regarding user interest as well as predictions pertaining to demand for a future product or service based on user characteristics and behavior.

Figure 7:
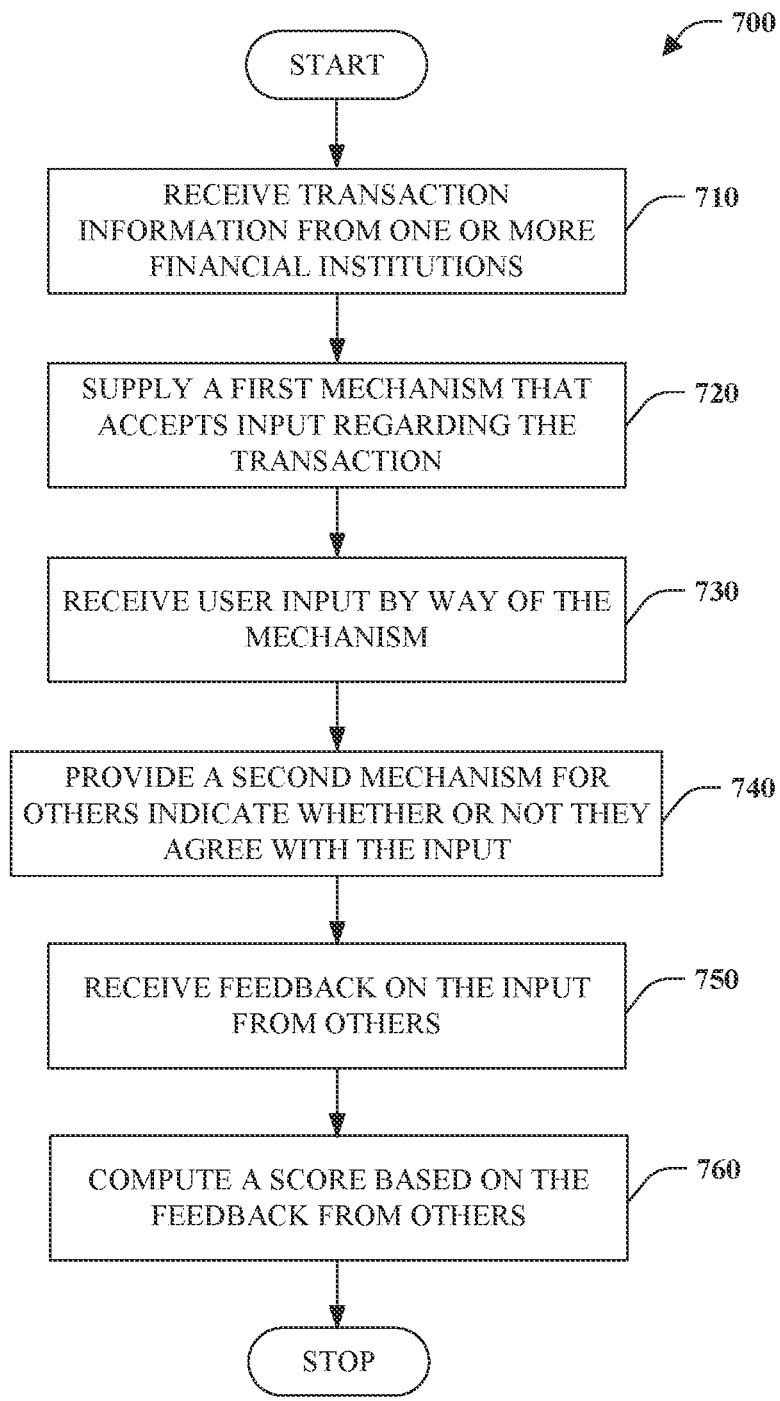
FIG. 7 is a flow chart diagram of a method of input valuation.
Figure 8:
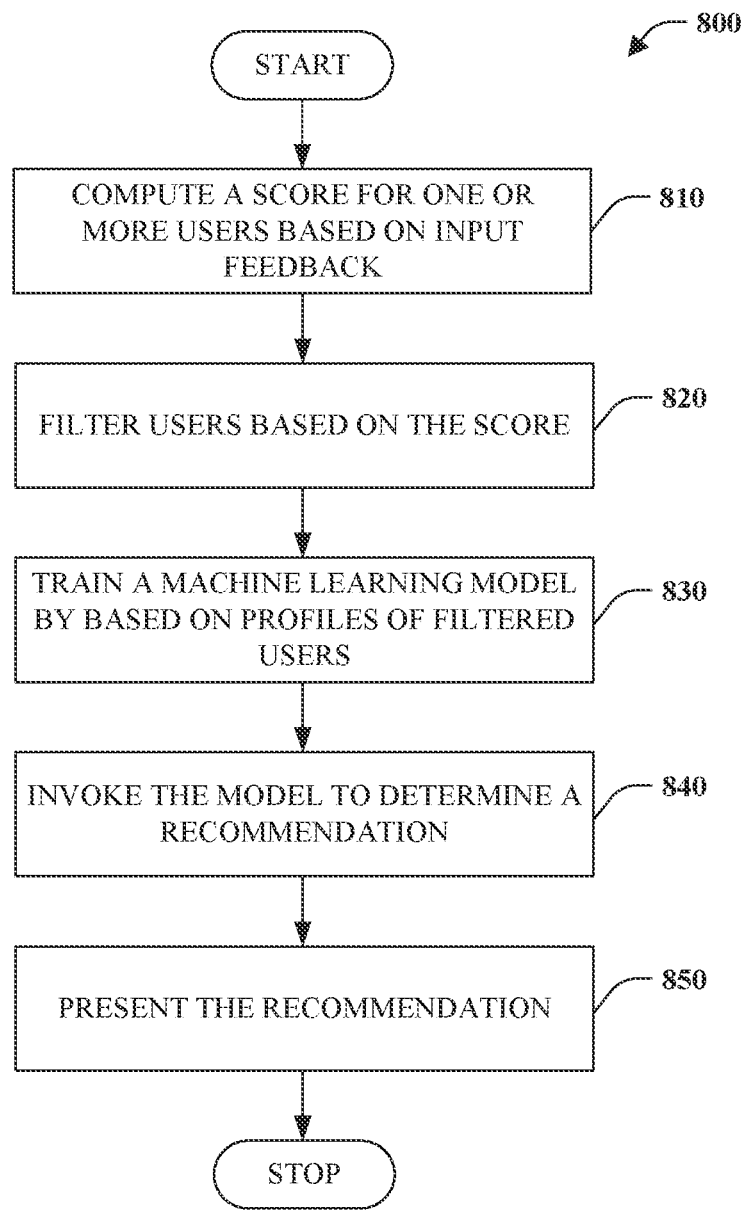
FIG. 8 is a flow chart diagram of a method of recommendation generation.
Figure 9:
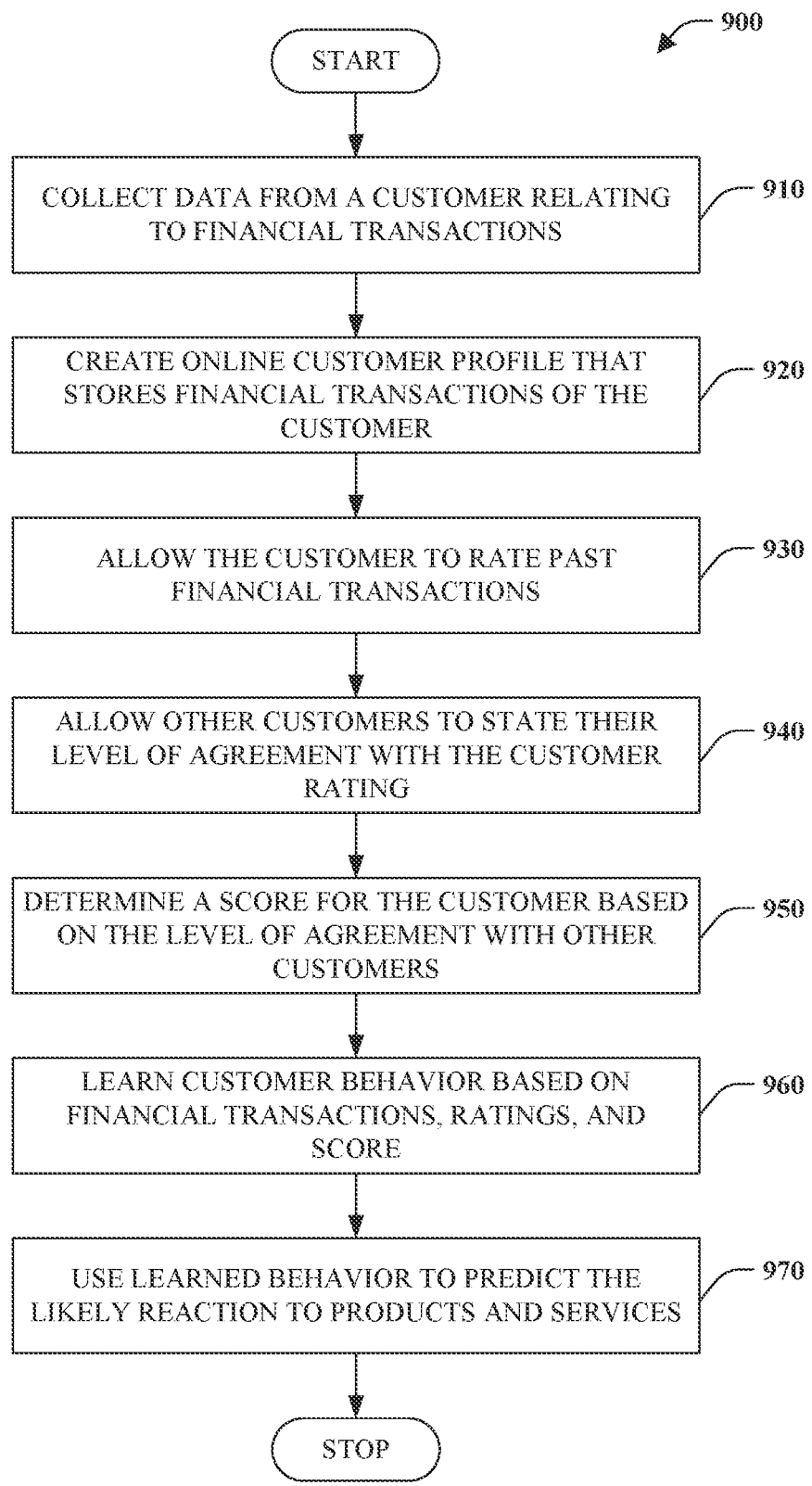
FIG. 9 is a flow chart diagram of a method of identifying products or services that are likely of interest.

In view of the example systems described above methods that may be implemented in accordance with the disclosed subject matter will be better appreciated with reference to flow chart diagrams of FIGS. 7-9. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 7 illustrates a method of input valuation 700 that can be implemented by the unified system 100 or various subsystems or components including the input valuation system 106. In one instance, the input valuation can facilitate efficient and accurate predictions associated with the recommendation system 104.

At numeral 710, transactional information can be received, retrieved, or otherwise obtained or acquired from one or more financial institutions. For example, a bank customer could provide credentials such as username and passcode to access transaction data associated with the customer. In response to successful authentication and authorization, transaction data or information can be provided regarding products and services purchased. In addition to transaction details, customer details can be provided including, but not limited to, name, address, identity details, bank account number, and branch where the account was opened. In one embodiment, one or more interfaces may be provided to acquire information from financial providers. Received information can be utilized to generate or update a profile of a user. Optionally, a wish list of products or services can be created based at least on prior purchases. For example, the wish list can be created based on predictions of products or services of interest determined on the basis of prior purchases or purchases of similar users, and the wish list can be stored as part of a user profile.

At numeral 720, a mechanism that accepts input regarding transactions is provided. For example, each transaction can include a text box for receipt of comments. Additionally, or alternatively, a mechanism can be provided to allow a user to rate the transaction, for example, as good or bad or along a continuum from good to bad, or the like. In accordance with one embodiment, transactions can be provided in a financial social media application. In this context, users of the financial social media application can post comments or reviews on products or services previously purchased.

At reference numeral 730, input provided by a user by way of the provided mechanism is received, retrieved, or otherwise acquired. After received, the input can be scanned to validate the comments or rating. For example, the comments can be analyzed to ensure they comply with any system or user policies. Further, a user can be contacted to confirm the comments or ratings were made by the user and are accurate.

At numeral 740, a mechanism is provided for others to indicate a level of agreement or disagreement with respect to the user input. In other words, user input, such as a product review/comment or rating, can be reviewed and validated by other users. In the context of a social media application, a post regarding a product or service, including a review or rating, can include a mechanism to express agreement or disagreement of other users. For example, there may be a simple button or drop-down menu to express either agreement or disagreement associated with the post. Alternatively, the mechanism can provide an ability to select a degree of agreement or disagreement such as by way of rating (e.g., 1-5, strongly agree-strongly disagree . . . ). Input provided by way of the mechanism can be received at numeral 750.

At reference numeral 760, a score can be computed based on feedback from others. The score can reflect an extent of agreement or disagreement associated with user input such as a product review or rating. In other words, product or service reviews posted by a user can be validated based on users of the same product or service. Additionally, an option can be provided for validation by other users based on relationship or proximity in connection between users, among other things. Regardless, the score captures feedback on the input to aid in valuation of the input. In accordance with one implementation, the score can be expressed as a percentage or value out of a total of one hundred. For example, a score of eighty can represent a valid and valuable input. By contrast a score of twenty can denote an invalid and unvaluable input corresponding to an outlier. Further, the score can reflect an aggregate of feedback with respect to multiple inputs, comments, or ratings of a user. Such a score can thus be associated with the user as opposed to each individual input.

FIG. 8 is a flow chart diagram of a method 800 of recommendation generation. In accordance with one embodiment, the method 800 can be implemented by the recommendation system 104 and components thereof including the training component 420.

At reference numeral 810, a score is computed for one or more users based on input feedback. Input can correspond to a review or comment regarding a product or service. Further, the input can specify a rating with respect to a product or service such as good or bad or a point between or exceeding good and bad. In one instance, the input can correspond to a post on an electronic social media site. Other users can provide feedback that expresses extent to which they agree or disagree with the input. For example, others can note that they agree or disagree with the input or indicate a position along a continuum that represents their opinion on the input (e.g., 1-10, wherein 10 denotes strong agreement and 1 represents strong disagreement). A score can be computed on the basis of such feedback. The score can be associated with a user, input, or both.

At reference 820, users are filtered based on the score associated with a user. A comparison can be made between the score and a predetermined threshold. Based on a result of the comparison, users can be filtered out while other users are selected on the basis of their score. For instance, the predetermined threshold can represent a minimum acceptable score or a score below which is unacceptable. In essence, a set of scores can be designated as preferred over others. In this manner, users who are extreme and correspond to outliers can be filtered out. As an alternative, a weight can be assigned to a user based on score and utilized in a similar manner to filter out outliers, for instance by giving little or no weight to them.

At numeral 830, a machine learning model is trained based on profiles of filtered users. In a supervised learning context, the profiles of users that achieved a particular score can be utilized as training data from which the machine learning model can learn. For example, the model can glean information regarding certain demographics or characteristics of users that like or dislike particular products or services. Additionally, information can be learned regarding a relationship between products and services such that purchase of one may suggest interest in another. Further, similar users can be identified from the training data.

At numeral 840, a recommendation is determined by invoking the machine learning model trained at numeral 830. For instance, the identity of a particular user or features of the user captured in a user profile can be provided as input to the machine learning model. The machine learning model can subsequently identify similar users, products or services purchased by such users, and select one or more of the products or services to recommend. Such a recommendation can be presented to a user at 850. For example, an electronic social network application can present the recommendation to the user in a dedicated location, on a news feed or elsewhere.

Referring to FIG. 9, a flow chart diagram is depicted showing a method 900 for identifying products or services that are likely of interest to a user for presentation as a recommendation, for example. In accordance with one embodiment, at least a subset of functionality of the method 900 can be performed by the unified system 100 including the social network system 102, input valuation system 106, and recommendation system 104 as well as subcomponents thereof. In one particular implementation, the functionality can be performed by one or more servers of a financial institution.

At reference numeral 910, data is collected from customers of a financial institution relating to financial transactions. For example, a bank customer can login to a bank website and download, or authorize downloading by an application or interface, transactions recorded by the bank. In other words, information pertaining to the purchase of products or services can be collected.

At numeral 920, an online customer profile is created that stores the financial transactions of the customer. The profile can include various additional information such as name, address, age, location, occupation, marital status, and education level, amongst other demographic information. The demographic information is combined with financial information including transactions for products or services, amongst other information collected from a financial institution such as name, address, and branch where the account was opened. Further, the bank customer can control the amount as well as type of data collected and utilized. Stated differently, a profile is generated from financial transaction information as well as demographic and other information.

At 930, customers are provided a means for rating or commenting regarding past financial transactions. In the context of an electronic social media application, financial transactions can be accessible, and mechanisms provided to foster support for reviewing and rating transactions, for instance in a network post. In one particular example, one of a number of ratings can be ascribed to a transaction. For instance, a thumbs up or thumbs down icon can be activated and associated with a transaction. Alternatively, a rating can correspond to one of a number of values on a continuum from approval to disapproval of a product or service. Further yet, comments or a review can be provided in a text box or by way of an online form, among other things.

At numeral 940, a means is provided to allow other customers to state their level of agreement with the customer rating. A mechanism can be provided to signal agreement or disagreement associated with a customer rating. For example, the mechanism associated with a customer rating can provide for selection of a thumbs up icon to indicate agreement and a thumbs down icon to denote disagreement. Other embodiments are also possible and contemplated including, but not limited to providing a continuum of values or graphic elements to effectively rate a rating.

At reference numeral 950, a score for the customer is determined based on the level of agreement with other customers. A score representing a level of agreement or disagreement can be computed based on feedback from other users regarding a rating of a product or service. In one instance, a score corresponds directly to a rating by a customer. When there are more than one rating and feedback combination, the scores associated with the rating can be utilized to produce an aggregate or customer score. For example, customer score can be an aggregate of rating scores (e.g., average, median, running total, . . . ) or otherwise account for the rating scores. Customers comprising a crowd of individuals can thus evaluate a customer based on input provided as captured by the aggregate or customer score.

At 960, customer behavior is learned based on financial transactions, customer rating and feedback capture by a score. The behavior of the customer may be determined with the aid of machine learning techniques. Possible training data can be descriptions of products or services along with customer ratings of those products or services. The score can be treated as a level of value for data from the customer. Data from a customer with a low score may be tagged as having low value and either assigned a small weight or discounted altogether.

At numeral 970, learned behavior of a customer can be utilized to predict the likely reaction of others to products or services without the customer actually trying the products or services. A simple description of a product or service may be provided to a machine learning process to determine whether or not the customer would be likely to give the product or service a high rating.

Aspects of the subject disclosure concern a technical problem concerning electronic discovery, evaluation, and recommendation of products and services. The technical solution involves deploying a unified platform that provides for rating of transactions for goods or services, provisioning feedback regarding the rating, computing a score representing an extent to which other users agree or disagree with the rating based on the feedback, as well as learning customer behavior, predicting products of potential interest, and recommending such products. In one particular instance, the predictive accuracy and efficiency of artificial intelligence-based technologies are improved based on use of the score. For instance, a potential data set can be reduced by eliminating or at least mitigating the effects of customers representing an outlier opinion.

As described herein, the unified system 100 can be provided to allow access and interaction across multiple financial institutions or providers. In other words, the unified system 100 can correspond to a single point of contact with respect to financial services. In this matter, users can research and rate products and services across banks. However, aspects of the subject disclosure are not limited to employment in a system the unifies multiple providers. Rather, aspects can be directed to a single entity. For example, a single bank can provide features to allow users to discover, evaluate and receive recommendations regarding products of the bank.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

To provide a context for the disclosed subject matter, FIG. 11 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

Figure 10:
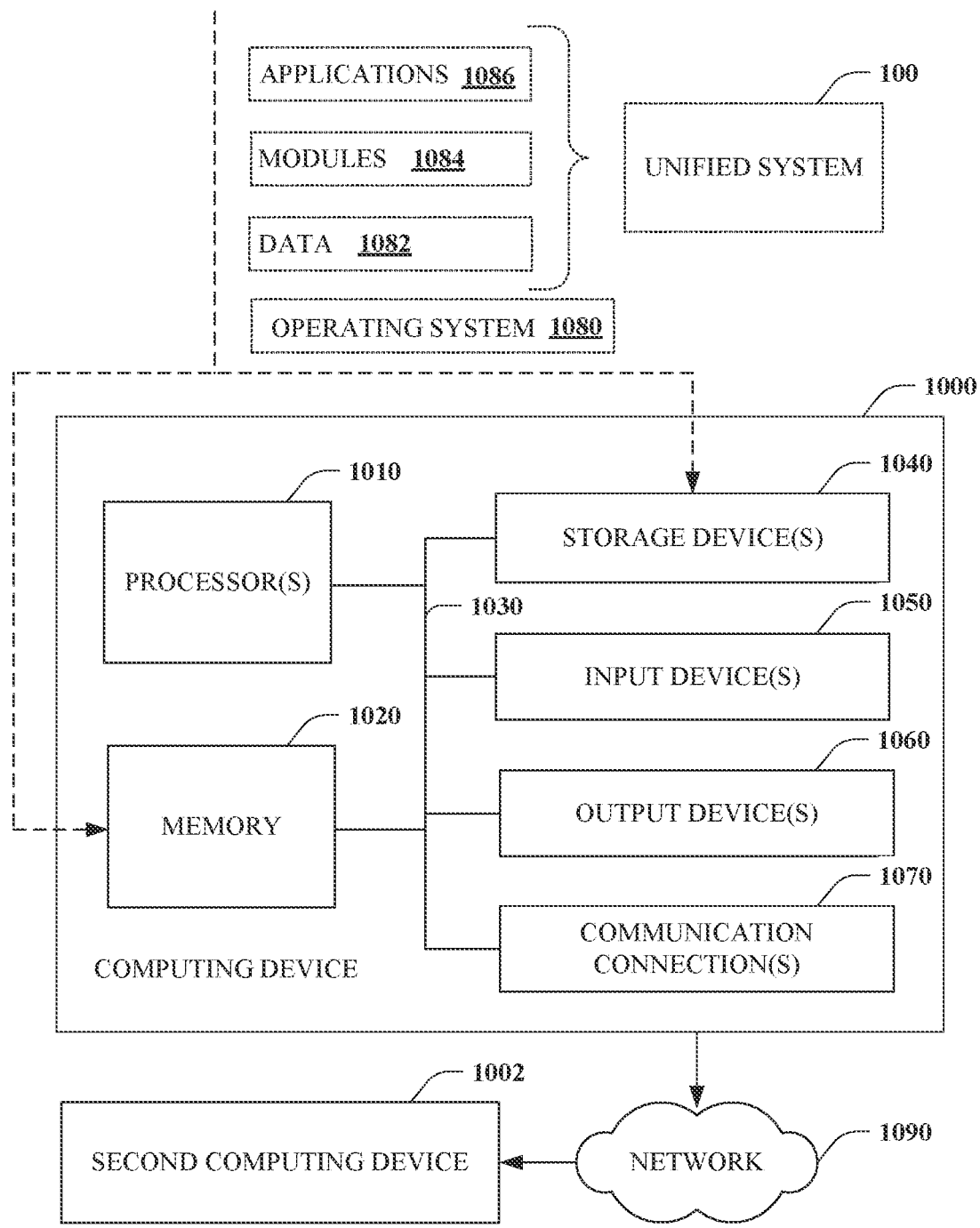
FIG. 10 is a schematic block diagram illustrating a suitable operating environment for aspects of the subject disclosure.

With reference to FIG. 10, illustrated is an example computing device 1000 (e.g., desktop, laptop, tablet, watch, server, hand-held, programmable consumer or industrial electronics, set-top box, game system, compute node . . . ). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer executable actions, instructions, and or components stored in the memory 1020.

The processor(s) 1010 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1010 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1010 can be a graphics processor unit (GPU) that performs calculations with respect to digital image processing and computer graphics.

The computing device 1000 can include or otherwise interact with a variety of computer-readable media to facilitate control of the computing device to implement one or more aspects of the disclosed subject matter. The computer-readable media can be any available media that is accessible to the computing device 1000 and includes volatile and nonvolatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1020 and storage device(s) 1040 are examples of computer-readable storage media. Depending on the configuration and type of computing device, the memory 1020 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1000, such as during start-up, can be stored in nonvolatile memory, while volatile memory can act as external cache memory to facilitate processing by the processor(s) 1010, among other things.

The storage device(s) 1040 include removable/non-removable, volatile/non-volatile storage media for storage of vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All or portions of the disclosed subject matter can be implemented using standard programming and/or engineering techniques to produce software, firmware, hardware, or any combination thereof to control the computing device 1000 to realize the disclosed functionality. By way of example and not limitation, all or portions of the unified system 100 can be, or form part of, the application 1086, and include one or more modules 1084 and data 1082 stored in memory and/or storage device(s) 1040 whose functionality can be realized when executed by one or more processor(s) 1010.

In accordance with one particular embodiment, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the unified system 100 and/or functionality associated therewith can be embedded within hardware in an SOC architecture.

The input device(s) 1050 and output device(s) 1060 can be communicatively coupled to the computing device 1000. By way of example, the input device(s) 1050 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth . . . ), or a combination thereof.

The computing device 1000 can also include communication connection(s) 1070 to enable communication with at least a second computing device 1002 by means of a network 1090. The communication connection(s) 1070 can include wired or wireless communication mechanisms to support network communication. The network 1090 can correspond to a local area network (LAN) or a wide area network (WAN) such as the Internet. The second computing device 1002 can be another processor-based device with which the computing device 1000 can interact. In one instance, the computing device 1000 can be a server executing functionality associated with the unified system 100. The second computing device 1002 can correspond to a computing device of a user or customer for use in posting product reviews or ratings, providing feedback on reviews or ratings of others, and receiving recommendations of products or services of potential interest.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
   a processor coupled to a memory that includes instructions, that when executed by the processor, cause the processor to:
   determine, by a score component, a first score associated with a user input regarding a first purchase posted in an electronic social network by a user, wherein the first score reflects a degree of agreement with the user input based on feedback to the user input posted in the electronic social network by other users;
   train, by a training component, a model using training data comprising a set of scores that satisfy a predetermined threshold to determine recommendations for products or services, wherein the set of scores comprises the first score;
   determine, by a recommendation component and using the model, a first recommendation for the user based on a user profile of the user and the first score;
   convey, for display on a device and via a communication connection, the first recommendation in the electronic social network;
   facilitate, by a profile component, a transaction for a product associated with the recommendation via the electronic social network; and
   modify, by the profile component, a purchase history of the user profile based on the transaction.

2. The system of claim 1, wherein the electronic social network is a financial social network concerning financial products or services.

3. The system of claim 2, wherein the financial social network unifies interaction with multiple financial institutions.

4. The system of claim 1, wherein the user profile comprises information regarding past purchases provided by a financial institution.

5. The system of claim 1, wherein the first recommendation comprises identification of a product or service and one or more other users that have commented regarding the product or service.

6. The system of claim 5, wherein the first score exceeds the predetermined threshold.

7. The system of claim 1, wherein the model is a machine learning model.

8. The system of claim 7, wherein training the machine learning model comprises clustering like users based on the feedback.

9. A method, comprising:
   determining, by a score component, a first score associated with a user input regarding a first purchase posted in an electronic social network by a user, wherein the first score reflects a degree of agreement with the user input based on feedback to the user input posted in the electronic social network by other users;
   training, by a training component, a model using training data comprising a set of scores that satisfy a predetermined threshold to determine recommendations for products or services, wherein the set of scores comprises the first score;
   determining, by a recommendation component and using the model, a first recommendation for the user based on a user profile of the user and the first score; and
   conveying, for display on a device and via a communication connection, the first recommendation in the electronic social network;
   facilitating, by a profile component, a transaction for a product associated with the recommendation via the electronic social network, and
   modifying, by the profile component, a purchase history of the user profile based on the transaction.

10. The method of claim 9, wherein the electronic social network is a financial social network concerning financial products or services.

11. The method of claim 9, further comprising:
determining, by the score component, a group of users based on a similarity of user profiles of the group of users to the user profile of the user.

12. The method of claim 9, further comprising:
requesting, by the profile component, transaction data from a financial institution of the user; and
populating, by the profile component, the user profile with the transaction data received from the financial institution.

13. The method of claim 9, wherein the first recommendation comprises a product or service from a set of financial products or services.

14. The method of claim 13, wherein the set of financial products or services includes financial products or services from a plurality of financial institutions.

15. The method of claim 9, wherein the user input comprises at least one of a review or rating of a product or service.

16. A computer program product storing software instructions that, when executed, cause an apparatus to:
determine a first score associated with a user input regarding a first purchase posted in an electronic social network by a user, wherein the first score reflects a degree of agreement with the user input based on feedback to the user input posted in the electronic social network by other users;
train a model using training data comprising a set of scores that satisfy a predetermined threshold to determine recommendations for products or services, wherein the set of scores comprises the first score;
determine, using the model, a first recommendation for the user based on a user profile of the user and the first score;
convey, for display on a device, the first recommendation in the electronic social network;
facilitate a transaction for a product associated with the recommendation via the electronic social network; and
modify a purchase history of the user profile based on the transaction.

17. The computer program product of claim 16, wherein the software instructions, when executed, further cause the apparatus to:
select the user from a group of users based on the score; and
predict a product or service that is likely of interest based on the user profile of the user.

18. The computer program product of claim 17, wherein the model is a machine learning model.

19. The computer program product of claim 16, wherein the software instructions, when executed, further cause the apparatus to:
determine a group of users including the user; and
present the first recommendation to the group of users.

20. The computer program product of claim 16, wherein the electronic social network is a financial social network concerning financial products or services.

* * * * *